United States Patent [19]
Doerter

[11] Patent Number: 5,268,189
[45] Date of Patent: Dec. 7, 1993

US005268189A

[54] PROCESS FOR EXTENDING THE SHELF-LIFE OF SHELLFISH PRODUCTS

[75] Inventor: Carl R. Doerter, Scranton, N.C.

[73] Assignee: Capt'n Carl's Seafood, Inc., Scranton, N.C.

[21] Appl. No.: 861,447

[22] Filed: Apr. 1, 1992

[51] Int. Cl.$^5$ ............... A23B 1/005; A23L 1/0532; B65B 55/02

[52] U.S. Cl. ................... 426/573; 426/407; 426/412; 426/575; 426/643

[58] Field of Search .......... 426/106, 132, 393, 407, 426/412, 521, 524, 573, 642, 643, 652, 575

[56] References Cited

U.S. PATENT DOCUMENTS 5,063,073  11/1991  Kratochvil ................... 426/573

FOREIGN PATENT DOCUMENTS 2121752  1/1984  United Kingdom ................ 426/412

Primary Examiner—Leo B. Tentoni
Attorney, Agent, or Firm—Olive & Olive

[57] ABSTRACT

The process disclosed relates to the preservation of shellfish products so as to extend the shell-life of shellfish thereof. A thermally conductive mixture which forms a liquid barrier upon heating and a gel upon cooling is introduced to the shellfish container for packaging. Specific steps of heating to kill bacteria and other undesirable microorganisms and subsequent rapid cooling are required. Ultimate refrigeration of the packaged product is undertaken for long-term storage.

7 Claims, 1 Drawing Sheet

PROCESS FOR EXTENDING THE SHELF-LIFE OF SHELLFISH PRODUCTS

FIELD OF THE INVENTION

The present invention relates to the field of food processing and preservation and, more particularly to the preservation of seafood and shellfish.

BACKGROUND OF THE INVENTION

Shellfish, such as crab, shrimp, lobster and the like have a number of unique characteristics. Shellfish meat has a characteristic taste and texture. Shellfish are typically cooked in a manner different than that of other meat or fish products. Shellfish tend to spoil relatively quickly in storage due to the usual presence of spoilage bacteria, such as *Listeria monocytogenes*. In addition, such microorganisms as infectious Staphylococcus, Salmonella and potentially pathogenic microorganisms are frequently present.

There have been attempts to improve the storage life of shellfish which have resulted in various degrees of failure. Although freezing deters spoilage, freezing also results in deterioration of shellfish texture and taste. Shellfish meat removed from the shell may be effectively pasteurized, but such method has not been usable on meat in the shell because when done in water, the meat becomes saturated and when done in air, the meat is cooked. Saturated shellfish meat loses both taste and texture due to cell rupture or degradation. Cooking is not desired in this process because the consumer usually wishes to purchase a fresh, uncooked product, or, if the shellfish product is to be purchased after cooking, pasteurization causes overcooking of the already cooked shellfish.

Because of the ineffectiveness of prior attempts to extend shellfish shelf-life known in the industry, the acceptable shelf-life of shellfish in the shell under refrigeration is a maximum of 7-10 days. This means that a restaurant or retail store which sells shellfish must obtain fresh supplies of shellfish at least weekly, and must dispose of the older product.

The short shelf-life of in-the-shell shellfish products also requires the consumer to be wary of the possibility of purchasing a shellfish product that is at or near its expiration time and, if the shellfish product is purchased in good time, to use the shellfish fairly quickly. The shelf-life problem is substantially similar whether the shellfish are fresh or cooked.

As used herein, the terms "shellfish" and "shellfish product" are used interchangeably and refer to either the entire shellfish or to the shellfish meat portions as removed from the shell.

Therefore, an objective of the present invention is to provide a process for extending the shelf-life of shellfish.

An additional objective of the invention is to provide a process which retains the natural flavor and texture of a shellfish product.

A further objective of the invention is to provide a process which is effective with either fresh or cooked shellfish.

These and other objectives of the invention disclosed will become apparent to those skilled in the art as the description below is understood.

SUMMARY OF THE INVENTION

The invention disclosed relates to the processing of shellfish products to extend the useful shelf life beyond that presently available. The fresh or cooked shellfish product is packed in a container into which is poured a solution effective as a heat transfer medium and as a liquid barrier, after which the container is sealed. The sealed container is heated sufficiently to kill the natural bacteria and then chilled quickly. The container is then quickly subjected to refrigeration for long term storage.

DESCRIPTION OF THE PREFERRED EMBODIMENT

Figure 1:
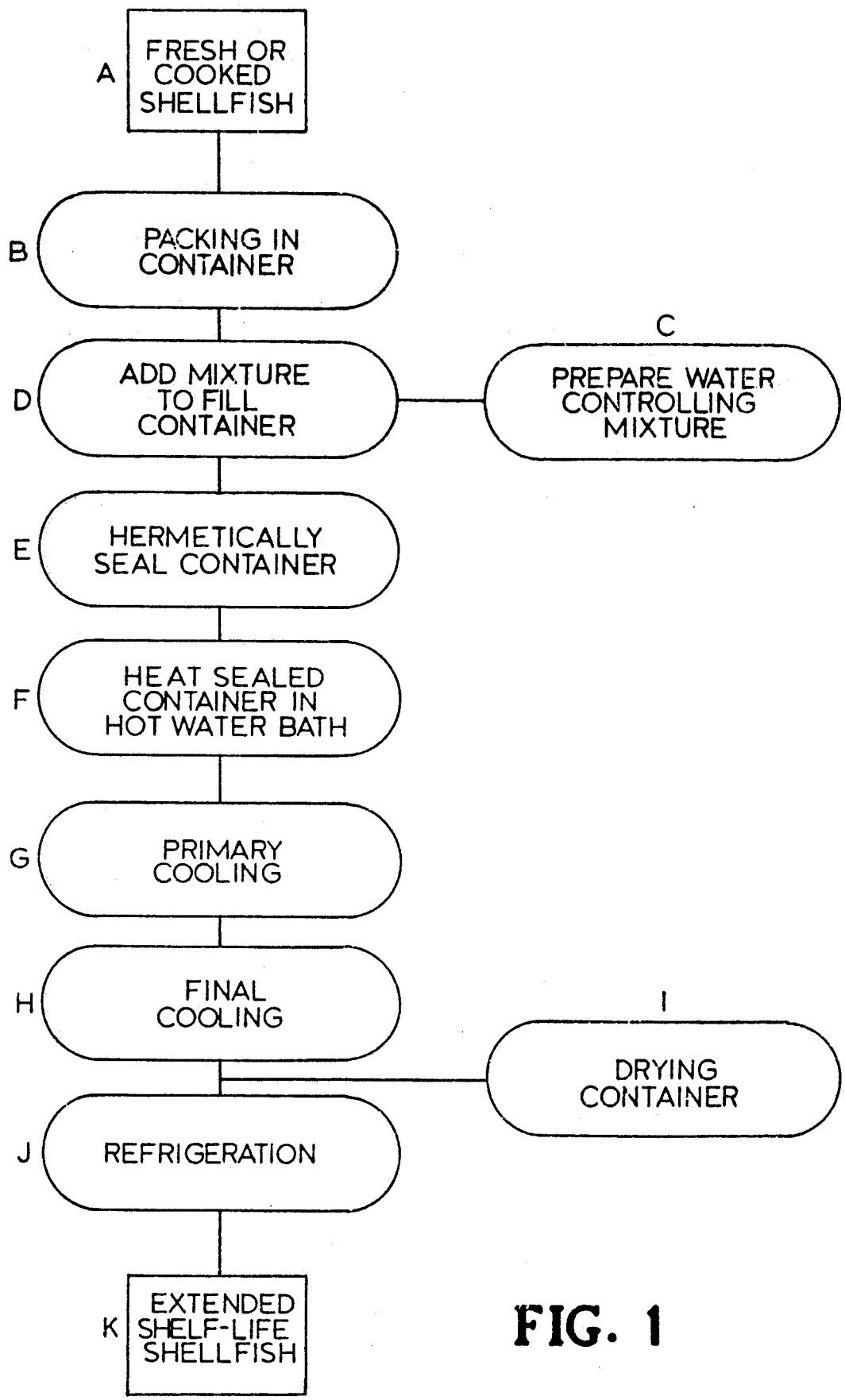
FIG. 1 is a flowchart of the steps involved in the process of the invention.

The invention involves a series of specific processing steps as are illustrated in the form of a flowchart in the FIGURE included. The initiation of the process occurs after the shellfish have been prepared for packaging. The shellfish products to which this invention applies include edible crustaceans such as crab, shrimp, crawfish, lobster and the like which are to be preserved in the shell or removed from the shell. Preparation for packaging typically includes washing and eviscerating the shellfish, if the product is to be packed fresh. Additionally, if the shellfish are to be cooked, the cooking is done prior to the beginning of the process of the invention. Whether the shellfish product is cooked or not, the steps disclosed below are followed after washing and eviscerating.

In FIG. 1, Step A represents the shellfish product to be packed with its shell. In Step B, the shellfish product is packed into a container, such as a number 10 commercial metal can, or, alternatively, a plastic container which is capable of being hermetically sealed. The plastic container may be rigid or flexible, such as a pouch. No special care need be taken to pack the product tightly or to eliminate air from the package. Plastic containers of, for example, high density polyethylene resin have been shown to withstand the process of the invention and to be hermetically sealable. However, plastic containers are generally less thermally conductive than metal containers.

After the product is in the container, a water-controlling mixture having specific temperature-sensitive response and water barrier characteristics must be prepared and added. In general, the mixture is capable of readily transferring heat to or from the product and upon heating forms a water-entrapping matrix which acts as a barrier to liquid transfer to or from the product. Upon cooling, the mixture forms a gel which prevents loss of fluid from the shellfish. It is contemplated that any mixture having these characteristics and being acceptable for use in food products may be used in the instant invention.

In the preferred embodiment of the invention, the mixture is prepared in Step C by adding carrageenan (e.g., Irish moss extract) to water. Carrageenan is a food additive substance available from FMC Corporation of Philadelphia, Pa. and approved by the United States Federal Food and Drug Administration. Carrageenan is added to water at a concentration of $\frac{1}{4}\%$ to $2\frac{1}{2}\%$ based on the combined weight of the product and the water; the preferred mixture contains 1% carrageenan. Mixing takes place at a temperature of between 1°-22° C.

(34°-71° F.), preferrably at 10° C. (50° F.). Thorough mixing and blending of the carrageenan into the water is essential to successful results. The mixture is best kept at a temperature of 1°-12° C. (34°-55° F.) so as to minimize precipitation until ready for use.

The prepared mixture of water and carrageenan is added to the container into which the shellfish have been placed (Step D). The mixture fills the container and effectively forces any air from the container, leaving only shellfish and the carrageenan mixture.

In Step E of the process, the container is sealed hermetically. This is accomplished by any commercial or proprietary process. It is important that the quantity of prepared mixture is correct in order to avoid entrapment of air and to not interfere with the proper closure of the container.

The next procedure is sterilization, or pasteurization (Step F). In order to effectively kill the naturally occurring microorganisms, such as *Listeria monocytogenes*, Salmonella, Staphylococcus, or other pathogens, spoilage microorganisms or other undesirable microorganisms, the temperature must be raised to between about 66°-94° C. (150°-200° F.). When the shellfish are packaged in a metal can, a temperature of 84° C. (185° F.) is preferred. If the container selected is of plastic, the composition of the plastic may restrict the temperature that may be used. With the preferred high density polyethylene plastic material, a temperature of 82° C. (180° F.) is applied.

As the filled containers are being heated, the carrageenan begins to create a moisture entrapping crystalline-like network beginning at a temperature of about 15° C. (59° F.), which condition prevails throughout the balance of processing and storage.

In order to achieve good thermal transfer to the containers and their contents, a heating medium, such as a heated liquid bath surrounds the sealed containers during this pasteurization step. It is recognized that liquids generally are better heat transfer media than gases. The surrounding liquid, preferrably water, is recirculated and aerated at the same time. The recirculation takes place at a rate of not less than 38 liters (ten gallons) per minute with simultaneous introduction of air at a pressure of not less than 140 g/sq. cm. (2 psi) through apertures distributed throughout the floor of the heating tank. This aerating and circulating procedure ensures a uniform heat distribution in the liquid bath and maximizes the speed of heat transfer to the product and mixture.

The time of processing in the heated bath is dependent on a number of factors, including, but not limited to the size of the bath, the number of containers in the bath, the size and thermal conductivity of the individual containers, the temperature of the bath, etc. as is known in the art. The ultimate determination of completeness of the pasteurization is whether the spoilage bacteria, pathogenic microorganisms and other undesirable microorganisms have been killed. This may be accomplished generally by keeping metal containers of shellfish in the heated bath for approximately 40 minutes (longer for plastic containers) as is known in the art. This heating process is designed to achieve a 31-minute lethality according to the guidelines of the National Blue Crab Institute of America.

Following the pasteurization step described above, the containers are removed from the heated bath and placed into a primary cooling bath according to Step G for rapid removal of the acquired heat. The temperature of the primary cooling bath is in the range of about 13°-27° C. (55°-80° F.). A temperature of 16° C. (60° F.) is considered optimal. Optionally, recirculation and aeration may be employed in the primary cooling step to keep the temperature uniform, improve heat transfer from the containers and decrease immersion time. The time required in this step to cool the heated containers is dependent on the factors enumerated above in regard to heating.

According to this preferred embodiment, at the conclusion of the primary cooling step G, the containers are transferred to a final cooling bath in step H. The final cooling bath liquid is maintained in the range of 2°-8° C. (34°-45° F.), the preferred liquid temperature being 5° C. (40° F.). Recirculation and aeration provide similar benefits as discussed above and may be employed. This cooling step is performed long enough that the internal temperature reaches 9° C. (48° F.) or less.

During the process described above, the carrageenan-based mixture goes through a change in physical characteristics. The mixture upon heating forms into a semi-solid crystalline matrix which effectively absorbs the water in which it was mixed. It therefore prevents liquid transfer to and from the shellfish and upon subsequent cooling, the mixture becomes firm and exhibits properties like a gel. The degree of firmness will vary with the proportions of the mix. Once hardened, the gel does not give any of its liquid to the shellfish product and does not absorb any moisture from the product. In this manner, the gel serves to encapsulate and preserve the product so that the taste and the texture of the shellfish is preserved and its shelf-life extended.

After removing the container from the final cooling bath of Step H, it is generally desirable to dry the exterior of the container prior to placing the containers into cartons. This drying is to prevent rust when a metal container is used, and to keep the carton from being saturated. Exterior drying does not affect the product.

Within 30 minutes of the completion of the final cooling step, it is important to place the packaged product into a refrigerated environment (Step J). The refrigeration temperature must be maintained at between between about 0°-8° C. (32°-45° F.). To optimize the benefits of the process disclosed, refrigeration is maintained until the product is ready for consumption. Shelf-life under proper refrigeration prevents liquid transfer and cellular degradation and retains original taste. According to industry practice, an indication of packaging date or expiration date is marked on the individual containers. When the shellfish is removed from the container prior to consumption, the carrageenan gel is removed easily by rinsing with water.

By the process disclosed herein, the major objectives of the invention have been satisfied. The specific examples used herein as part of the preferred embodiment are not intended as limitations upon the scope and principle of the invention.

What is claimed is:

1. A process for extending the useful shelf-life of shellfish, comprising:
    (a) packing a shellfish product in a hermetically sealable container;
    (b) preparing a liquid mixture comprising a heat actuated water-controlling gel-forming composition at a temperature between 1°-22° C.;
    (c) pouring a quantity of said mixture into said container;
    (d) hermetically sealing said container;

(e) heating said sealed container including said shellfish product and said mixture in a heating medium to a selected temperature for a selected period of time;

(f) rapidly cooling said sealed container in a cooling medium; and (g) refrigerating said cooled container.

2. The process according to claim 1 in which said mixture preparation temperature is approximately 10° C.

3. The process according to claim 2 in which said selected temperature for heating said sealed container including said shellfish product and said mixture is between 66°-94° C.

4. The process according to claim 3 in which said selected temperature for heating said sealed container including said shellfish product and said mixture is approximately 84° C.

5. The process according to claim 3 in which said heating medium is recirculated and aerated.

6. The process according to claim 3 in which said cooling medium comprises a series of cooling baths including a primary cooling bath and a final cooling bath in sequential process steps.

7. The process according to claim 3 further comprising agitating and circulating the cooling medium.

* * * * *